United States Patent
Liu et al.

(10) Patent No.: US 11,012,215 B2
(45) Date of Patent: May 18, 2021

(54) INFORMATION TRANSMISSION METHOD, TERMINAL DEVICE AND NETWORK DEVICE

(71) Applicant: GUANGDONG OPPO MOBILE TELECOMMUNICATIONS CORP., LTD., Guangdong (CN)

(72) Inventors: Jianhua Liu, Dongguan (CN); Ning Yang, Dongguan (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 0 days.

(21) Appl. No.: 16/475,535

(22) PCT Filed: Jan. 4, 2017

(86) PCT No.: PCT/CN2017/070188
§ 371 (c)(1),
(2) Date: Jul. 2, 2019

(87) PCT Pub. No.: WO2018/126365
PCT Pub. Date: Jul. 12, 2018

(65) Prior Publication Data
US 2019/0334678 A1    Oct. 31, 2019

(51) Int. Cl.
*H04L 5/00* (2006.01)
*H04W 72/12* (2009.01)

(52) U.S. Cl.
CPC ....... *H04L 5/0051* (2013.01); *H04W 72/1236* (2013.01); *H04W 72/1268* (2013.01); *H04W 72/1273* (2013.01); *H04W 72/1289* (2013.01)

(58) Field of Classification Search
CPC ......... H04W 72/1284; H04W 72/1236; H04W 72/1273; H04W 72/1268; H04L 5/0051
See application file for complete search history.

(56) References Cited

U.S. PATENT DOCUMENTS 8,223,712 B2   7/2012 Kim
8,797,978 B2   8/2014 Li
(Continued)

FOREIGN PATENT DOCUMENTS

CN    101610564 A    12/2009
CN    102355732 A    2/2012
(Continued)

OTHER PUBLICATIONS

Supplementary European Search Report in the European application No. 17890036.1, dated Dec. 2, 2019.
International Search Report in international application No. PCT/CN2017/070188, dated Oct. 11, 2017.
Written Opinion of the International Search Authority in international application No. PCT/CN2017/070188, dated Oct. 11, 2017.
First Office Action of the Chilean application No. 201901846, dated Apr. 20, 2020.
(Continued)

*Primary Examiner* — Syed Ali

(57) ABSTRACT

Provided are an information transmission method, a terminal device and a network device. The information transmission method includes that: a terminal device receives a downlink channel sent from a first network device, the downlink channel carrying downlink scheduling information and uplink scheduling information of the terminal device; and the terminal device performs, according to the downlink channel, data transmission with the first network device. By means of the information transmission method, the terminal device and the network device provided in the embodiments of the present application, overheads of a channel can be saved, thereby saving data transmission time.

8 Claims, 4 Drawing Sheets

(56) References Cited

U.S. PATENT DOCUMENTS

| | | |
|---|---|---|
| 2007/0177541 A1 | 8/2007 | Kwon et al. |
| 2010/0116767 A1 | 5/2010 | Yano et al. |
| 2010/0118787 A1* | 5/2010 | Yano ............... H04L 1/1867 370/328 |
| 2010/0157922 A1 | 6/2010 | Kim |
| 2012/0033627 A1 | 2/2012 | Li |
| 2012/0182977 A1* | 7/2012 | Hooli ............ H04W 72/1278 370/336 |
| 2013/0065631 A1* | 3/2013 | Lu ..................... H04L 1/0003 455/522 |
| 2013/0235831 A1 | 9/2013 | Yano et al. |
| 2013/0235832 A1 | 9/2013 | Yano et al. |
| 2014/0307659 A1* | 10/2014 | Kweon ............... H04W 76/34 370/329 |
| 2014/0314009 A1* | 10/2014 | Xiong ................ H04W 76/14 370/329 |
| 2015/0071213 A1* | 3/2015 | Pajukoski ........ H04W 72/1284 370/329 |
| 2016/0242228 A1* | 8/2016 | Song .................. H04W 68/02 |
| 2017/0099127 A1* | 4/2017 | Byun .................. H04L 5/0053 |
| 2017/0325205 A1* | 11/2017 | Zhou ............... H04W 72/1284 |
| 2018/0013533 A1* | 1/2018 | Yang .................. H04L 5/001 |
| 2018/0110062 A1* | 4/2018 | Byun .................. H04L 5/0044 |
| 2018/0192311 A1* | 7/2018 | Zeng ................. H04W 16/14 |
| 2018/0242160 A1* | 8/2018 | Morita ............... H04W 36/22 |
| 2019/0141702 A1* | 5/2019 | Li ..................... H04W 74/006 |

FOREIGN PATENT DOCUMENTS

| | | |
|---|---|---|
| EP | 2187661 A1 | 5/2010 |
| EP | 3547775 A1 | 10/2019 |

OTHER PUBLICATIONS

3GPP TS 36.321 V13.0.0 (Dec. 2015), 3rd Generation Partnership Project;Technical Specification Group Radio Access Network;Evolved Universal Terrestrial Radio Access (E-UTRA);Medium Access Control (MAC) protocol specification (Release 13).

3GPP TS 36.212 V13.0.0 (Dec. 2015), 3rd Generation Partnership Project;Technical Specification Group Radio Access Network;Evolved Universal Terrestrial Radio Access (E-UTRA);Multiplexing and channel coding(Release 13).

Written Opinion of the International Search Authority in the international application No. PCT/CN2017/070188, dated Oct. 11, 2017.

Second Office Action of the Chilean application No. 201901846, dated Jul. 15, 2020.

First Office Action of the European application No. 17890036.1, dated Jan. 21, 2021.

First Office Action of the Indian application No. 201917030690, dated Feb. 5, 2021.

First Office Action of the Israeli application No. 267719, dated Dec. 10, 2020.

* cited by examiner

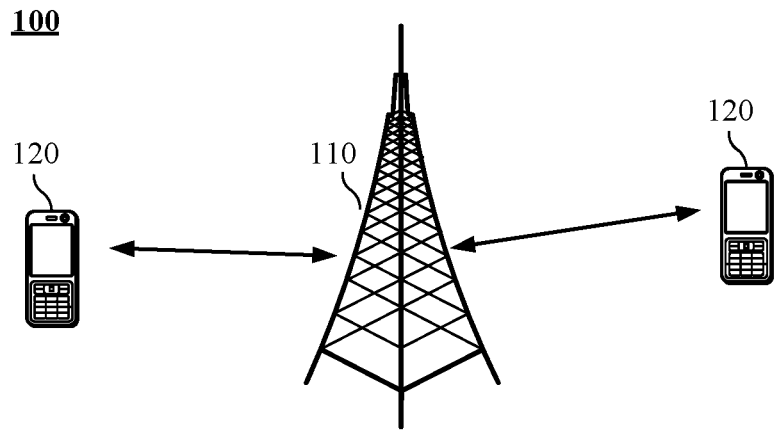

A terminal device receives a downlink channel from a first network device, the downlink channel carrying uplink scheduling information and downlink scheduling information of the terminal device ~ S210

The terminal device performs data transmission with the first network device according to the downlink channel ~ S220

A first network device sends a downlink channel to a terminal device, the downlink channel carrying uplink scheduling information and downlink scheduling information of the terminal device ~ S310

The first network device performs data transmission with the terminal device according to the downlink channel ~ S320

A second network device determines information of to-be-transmitted data to be sent to a first network device ~ S410

The second network device sends the information of the to-be-transmitted data to the first network device, so that the first network device sends a downlink channel carrying uplink scheduling information and downlink scheduling information to a terminal device according to the information of the to-be-transmitted data ~ S420

FIG. 4

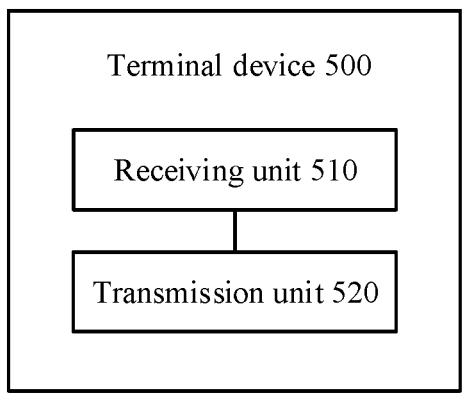

FIG. 5

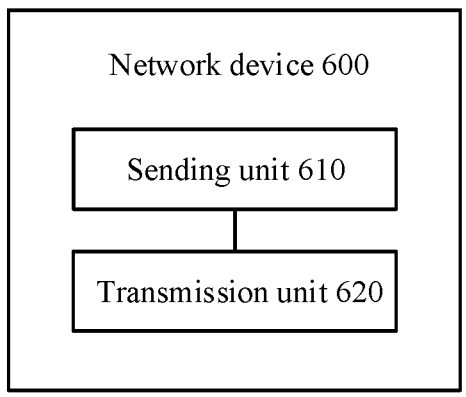

FIG. 6

INFORMATION TRANSMISSION METHOD, TERMINAL DEVICE AND NETWORK DEVICE

TECHNICAL FIELD

The present application relates to the field of wireless communications, and more particularly to an information transmission method, a terminal device and a network device in the field of wireless communications.

BACKGROUND

In a Universal Mobile Telecommunications System (UMTS), User Equipment (UE) has two basic operating modes. One is an idle mode, which is usually called a standby state. The other is a connection mode, in which there is a Radio Resource Control (RRC) connection between the UE and an evolved Terrestrial Radio Access Network (UTRAN). When the operating mode is the idle mode, UE needs to receive or send data, and then transfers to the connection mode for establishing a high-level signaling connection to transmit data.

However, regardless of whether a terminal device performs uplink data transmission or downlink data transmission, a downlink channel needs to be sent through an access network for scheduling, so overheads of a channel are relatively large.

SUMMARY

An information transmission method, a terminal device and a network device provided in the embodiments of the present application can save overheads of a channel.

According to a first aspect, the present application provides an information transmission method. The method may include operations that:
 a terminal device receives a downlink channel sent from a first network device, the downlink channel carrying downlink scheduling information and uplink scheduling information of the terminal device; and
 the terminal device performs data transmission with the first network device according to the downlink channel.

Specifically, a terminal device may receive, before performing data transmission with a first network device, a downlink channel sent from the first network device, the downlink channel carrying downlink scheduling information and uplink scheduling information of the terminal device, so as to perform data transmission with the first network device, according to the downlink channel.

It is to be understood that the downlink channel in the embodiments of the present application may also be a downlink signal. The downlink channel may be, for example, a downlink control channel, and the downlink signal may be, for example, a downlink control signal, which is not limited in the embodiments of the present application.

It is to be further understood that the uplink scheduling information in the embodiments of the present application is used for the terminal device to send uplink data to the network device, and the downlink scheduling information is used for the terminal device to receive downlink data sent from the network device.

Optionally, the scheduling information in the embodiments of the present application may include information about a resource location of data transmission and/or a modulation and coding level, which is not limited in the embodiments of the present application.

According to the information transmission method provided by the embodiments of the present application, the first network device provides uplink scheduling information and downlink scheduling information for the terminal device through the same downlink channel, and does not need to provide uplink scheduling information and downlink scheduling information for the terminal device through different downlink channels respectively, so that overheads of a channel can be saved.

In a possible implementation manner, before a terminal device receives a downlink channel sent from a first network device, the method may further include that: the terminal device sends an uplink scheduling request to the first network device, the uplink scheduling request being used to request for the uplink scheduling information. The operation that the terminal device receives the downlink channel sent from the first network device may include that: the terminal device receives the downlink channel sent from the first network device according to the uplink scheduling request.

Specifically, before the terminal device receives a downlink channel sent from the first network device, the terminal device may send an uplink scheduling request to the first network device, the uplink scheduling request being used to request for uplink scheduling information of uplink data to be transmitted. The operation that the terminal device receives the downlink channel sent from the first network device may be that: the terminal device receives the downlink channel sent from the first network device according to the uplink scheduling request.

Optionally, the uplink scheduling request may carry a data volume of the uplink data. The operation that the terminal device receives the downlink channel sent from the first network device may be that: the terminal device receives the downlink channel sent from the first network device according to the data volume of the uplink data.

Optionally, before the terminal device sends the uplink scheduling request to the first network device, the terminal device may acquire a scheduling request resource pre-allocated by the first network device for the uplink scheduling request. The operation that the terminal device sends the uplink scheduling request to the first network device may be that: the terminal device sends the uplink scheduling request to the first network device on the pre-allocated scheduling request resource.

Optionally, the uplink scheduling request may carry an identifier of the terminal device, so that the first network device identifies the terminal device, which is not limited in the embodiments of the present application.

Optionally, the scheduling request resource may include at least one of the following: a time domain resource, a frequency domain resource, a code domain resource, and a space resource.

According to the information transmission method provided by the embodiments of the present application, the terminal device requests to the first network device for uplink scheduling information, and it is indicated that the terminal device needs to send uplink data to the first network device. In this case, the terminal device may receive a downlink channel sent from the first network device, the downlink channel carrying the uplink scheduling information and the pre-assigned downlink scheduling information that may be subsequently required by the terminal device. When the terminal device subsequently needs to receive the downlink data sent from the first network device, the data transmission may be directly performed with the first network device, the downlink channel sent by the first network device and carrying the downlink scheduling information is not required to be received, thereby saving overheads of a channel and saving the time of data transmission.

In a possible implementation manner, the uplink scheduling request may carry first indication information, the first indication information being used to request the first network device to send the downlink scheduling information. The operation that the terminal device receives the downlink channel sent from the first network device according to the uplink scheduling request may include that: the terminal device receives the downlink channel sent from the first network device according to the first indication information.

Specifically, the uplink scheduling request may carry first indication information for requesting the downlink scheduling information, and it is indicated that the terminal device needs to receive downlink data sent from the first network device after sending uplink data to the first network device. The downlink data may be, for example, a feedback from the first network device about the received uplink data. The operation that the terminal device receives the downlink channel sent from the first network device according to the uplink scheduling request may be that: the terminal device receives the uplink scheduling information and the downlink scheduling information which are sent by the first network device according to the first indication information.

In a possible implementation manner, the uplink scheduling request may carry a data volume of downlink data desired to be received by the terminal device. The operation that the terminal device receives the downlink channel which is sent by the first network device according to the uplink scheduling request may include that: the terminal device receives the downlink channel which is sent by the first network device according to the data volume of the downlink data.

Specifically, the uplink scheduling request may carry a data volume of downlink data desired to be received by the terminal device, and it is indicated that the terminal device is desired to receive downlink data sent from the first network device after sending uplink data to the first network device. The downlink data may be, for example, a feedback from the first network device about the received uplink data. The operation that the terminal device receives the downlink channel sent from the first network device according to the uplink scheduling request may be that: the terminal device receives the uplink scheduling information and the downlink scheduling information which are sent by the first network device according to the data volume of the downlink data.

Optionally, the feedback received by the terminal device from the first network device about the uplink data in the embodiments of the present application may be an RRC feedback or an Automatic Repeat-ReQuest (ARQ) feedback, which is not limited in the embodiments of the present application.

Optionally, a time resource occupied by the downlink data may be a time resource desired to be used by the terminal device, or may be a time resource specified by the first network device, or may be a time resource determined according to an appointed rule between the terminal device and the first network device, which is not limited in the embodiments of the present application.

In a possible implementation manner, the uplink scheduling request may carry a first time resource at which downlink data is desired to be received by the terminal device. The operation that the terminal device performs data transmission with the first network device according to the downlink channel may include that: the terminal device performs the data transmission with the first network device on the first time resource.

Specifically, the uplink scheduling request may carry a first time resource at which downlink data is received by the terminal device and sent by the first network device. It is indicated that the terminal device is desired to receive downlink data sent from the first network device, and desired to receive downlink data from the first network device on the first time resource. The operation that the terminal device performs data transmission with the first network device according to the downlink channel may be that: the terminal device receives downlink data from the first network device on the first time resource.

In a possible implementation manner, when the uplink scheduling request does not carry a time resource at which downlink data is desired to be received by the terminal device, the downlink scheduling information may include a second time resource occupied by the downlink data. The operation that the terminal device performs data transmission with the first network device according to the downlink channel may include that: the terminal device performs the data transmission with the first network device on the second time resource.

Specifically, if a time resource for receiving downlink data is not specified by the terminal device, downlink scheduling information received by the terminal device may include a second time resource occupied by downlink data and specified by the first network device. The operation that the terminal device performs data transmission with the first network device according to the downlink channel may be that: the terminal device receives downlink data from the first network device on the second time resource.

In a possible implementation manner, the operation that the terminal device performs data transmission with the first network device according to the downlink channel may include that: the terminal device performs data transmission with the first network device according to the downlink channel and a preset first time interval, the first time interval being a time interval between a time when the terminal device receives the downlink channel and a time when the terminal device starts to perform data transmission with the first network device.

Specifically, the terminal device may send uplink data to the first network device, and/or receive downlink data from the first network device after a first duration after receiving the downlink channel sent from the first network device, where the first duration may be pre-agreed with the first network device.

Optionally, after receiving the downlink channel, the terminal device may send feedback information to the first network device, so that the first network device learns that the terminal device receives the downlink channel.

In a possible implementation manner, the operation that the terminal device performs data transmission with the first network device according to the downlink channel may include that: the terminal device sends uplink data to the first network device according to the uplink scheduling information; and/or the terminal device receives downlink data which is sent by the first network device according to the downlink scheduling information.

Optionally, after receiving the downlink channel, the terminal device obtains uplink scheduling information and downlink scheduling information, and may perform at least one of the operations of: sending uplink data to the first network device according to the uplink scheduling information, or receiving downlink data which is sent by the first network device according to the downlink scheduling information.

According to a signal transmission method provided by the embodiments of the present application, the uplink scheduling request may carry one or more of: the first indication information, the data volume of the downlink data and the first time resource. The first network device may be assisted to determine downlink scheduling information and uplink scheduling information of the terminal device, and the allocation of network resources can be optimized.

According to a second aspect, the present application provides an information transmission method. The method may include the operations as follows.

A first network device sends a downlink channel to a terminal device, the downlink channel carrying downlink scheduling information and uplink scheduling information of the terminal device.

The first network device performs data transmission with the terminal device according to the downlink channel.

It is to be understood that the downlink channel in the embodiments of the present application may also be a downlink signal. The downlink channel may be, for example, a downlink control channel, and the downlink signal may be, for example, a downlink control signal, which is not limited in the embodiments of the present application.

It is to be further understood that the uplink scheduling information in the embodiments of the present application is used for the terminal device to send uplink data to the network device, and the downlink scheduling information is used for the terminal device to receive downlink data sent from the network device.

Optionally, the scheduling information in the embodiments of the present application includes information about a resource location of data transmission and/or a modulation and coding level, which is not limited in the embodiments of the present application.

According to the information transmission method provided by the embodiments of the present application, the first network device provides uplink scheduling information and downlink scheduling information for the terminal device through the same downlink channel, and does not need to provide uplink scheduling information and downlink scheduling information for the terminal device through different downlink channels respectively, so that overheads of a channel can be saved.

In a possible implementation manner, before a first network device sends a downlink channel to a terminal device, the method may further include that: the first network device receives an uplink scheduling request sent from the terminal device. The operation that the first network device sends the downlink channel to the terminal device may include that: the first network device sends the downlink channel to the terminal device according to the uplink scheduling request.

Specifically, before the first network device sends the downlink channel to the terminal device, the first network device may receive an uplink scheduling request sent from the terminal device, the uplink scheduling request being used to request for uplink scheduling information of uplink data to be transmitted. The operation that the first network device sends the downlink channel to the terminal device may be that: the first network device sends the downlink channel to the terminal device according to the uplink scheduling request.

Optionally, the uplink scheduling request may carry a data volume of the uplink data. The operation that the first network device sends the downlink channel to the terminal device may be that: the first network device sends the downlink channel to the terminal device according to the data volume of the uplink data.

Optionally, before the first network device receives the uplink scheduling request sent from the terminal device, a scheduling request resource occupied by the uplink scheduling request may be specified by the first network device for the terminal device. The operation that the first network device receives the uplink scheduling request sent from the terminal device may be that: the first network device receives the uplink scheduling request from the terminal device on the pre-allocated scheduling request resource.

Optionally, the uplink scheduling request may carry an identifier of the terminal device, so that the first network device identifies the terminal device, which is not limited in the embodiments of the present application.

Optionally, the scheduling request resource includes at least one of the following: a time domain resource, a frequency domain resource, a code domain resource, and a space resource.

According to the information transmission method provided by the embodiments of the present application, the first network device receives an uplink scheduling request sent from the terminal device for requesting uplink scheduling information, and it is indicated that the first network device needs to receive uplink data sent from the terminal device. In this case, the first network device may send a downlink channel to the terminal device, the downlink channel carrying the downlink scheduling information that may be subsequently required by the terminal device and the uplink scheduling information. When the first network device subsequently needs to send the downlink data to the terminal device, data transmission may be directly performed with the first network device, the downlink channel carrying the downlink scheduling information is not required to be transmitted again, thereby saving overheads of a channel and saving the time of data transmission.

In a possible implementation manner, the uplink scheduling request may carry first indication information, the first indication information being used to request for sending the downlink scheduling information to the terminal device. The operation that the first network device sends the downlink channel to the terminal device according to the uplink scheduling request may include that: the first network device sends the downlink channel to the terminal device according to the first indication information.

Specifically, the uplink scheduling request may carry first indication information for requesting the downlink scheduling information, and it is indicated that the first network device needs to send downlink data to the terminal device after receiving uplink data sent from the terminal device. The downlink data may be, for example, a feedback about the received uplink data. The operation that the first network device sends the downlink channel to the terminal device according to the uplink scheduling request may be that: the first network device sends the downlink channel to the terminal device according to the first indication information.

In a possible implementation manner, the uplink scheduling request may carry a data volume of downlink data desired to be received by the terminal device. The Operation that the first network device sends the downlink channel to the terminal device according to the uplink scheduling request may include that: the first network device sends the downlink channel to the terminal device according to the data volume of the downlink data.

Specifically, the uplink scheduling request may carry a data volume of downlink data desired to be received by the terminal device, and it is indicated that the terminal device is desired to receive downlink data from the first network device after the first network device receives uplink data sent from the terminal device. The downlink data may be, for example, a feedback from the first network device about the received uplink data. The operation that the first network device sends the downlink channel to the terminal device according to the data volume of the downlink data may be that: the first network device sends the downlink channel to the terminal device according to the first indication information.

Optionally, the feedback sent by the first network device to the terminal device about the uplink data in the embodiments of the present application may be an RRC feedback or an ARQ feedback, which is not limited in the embodiments of the present application.

Optionally, a time resource occupied by the downlink data may be a time resource desired to be used by the terminal device, or may be a time resource specified by the first network device, or may be a time resource determined according to an appointed rule between the terminal device and the first network device, which is not limited in the embodiments of the present application.

In a possible implementation manner, the uplink scheduling request may carry a first time resource at which downlink data is desired to be received by the terminal device. The operation that the first network device performs data transmission with the terminal device according to the downlink channel may include that: the first network device performs data transmission with the terminal device on the first time resource.

Specifically, the uplink scheduling request may carry a first time resource at which downlink data is desired to be received by the terminal device. It is indicated that the terminal device is desired to receive downlink data sent from the first network device, and desired to send downlink data on the first time resource. The operation that the first network device performs data transmission with the terminal device according to the downlink channel may be that: the first network device performs data transmission with the terminal device on the first time resource.

In a possible implementation manner, the operation that the first network device sends the downlink channel to the terminal device according to the uplink scheduling request may include that: the first network device determines whether the uplink scheduling request carries a time resource at which downlink data is desired to be received by the terminal device; and if the uplink scheduling request does not carry a time resource at which downlink data is desired to be received by the terminal device, the first network device carries a second time resource at which downlink data is received by the terminal device in the downlink scheduling information. The operation that the first network device performs data transmission with the terminal device according to the downlink channel may include that: the first network device performs data transmission with the terminal device on the second time resource.

Specifically, the operation that the first network device sends the downlink channel to the terminal device according to the uplink scheduling request may be that: the first network device determines whether the uplink scheduling request carries a time resource at which downlink data is desired to be received by the terminal device after receiving the uplink scheduling request sent from the terminal device; and if the uplink scheduling request does not carry a time resource at which downlink data is desired to be received by the terminal device, the first network device may carry a second time resource at which downlink data is received by the terminal device in the downlink scheduling information. The operation that the first network device performs data transmission with the terminal device according to the downlink channel may be that: the first network device performs data transmission with the terminal device on the second time resource.

Optionally, the second time resource may be a time resource that is determined by the first network device according to a discontinuous receiving pattern pre-configured with the terminal device.

In a possible implementation manner, the operation that the first network device performs data transmission with the terminal device according to the downlink channel may include that: the first network device performs data transmission with the terminal device according to the downlink channel and a preset first time interval, the first time interval being a time interval between a time when the terminal device receives the downlink channel and a time when the first network device starts to perform data transmission with the terminal device.

Specifically, the first network device may receive uplink data sent from the terminal device, and/or send downlink data to the terminal device after a first duration after the terminal device receives the downlink channel, where the first duration may be pre-agreed with the terminal device.

Optionally, after receiving the downlink channel, the terminal device may send feedback information to the first network device. The first network device, after a first duration after receiving the feedback information, sends downlink data to the terminal device and/or receives uplink data sent from the terminal device.

According to a signal transmission method provided by the embodiments of the present application, the uplink scheduling request may carry one or more of: the first indication information, the data volume of the downlink data and the first time resource. The first network device may be assisted to determine downlink scheduling information and uplink scheduling information of the terminal device, and the allocation of network resources can be optimized.

In a possible implementation manner, before a first network device sends a downlink channel to a terminal device, the method may further include that: the first network device receives information of to-be-transmitted data sent from a second network device. The operation that the first network device sends the downlink channel to the terminal device may include that: the first network device sends the downlink channel to the terminal device according to the information of the to-be-transmitted data.

Specifically, before the first network device sends a downlink channel to the terminal device, the first network device may receive information of to-be-transmitted data sent from a second network device. It is indicated that the second network device requires the first network device to send downlink data to the terminal device. The operation that the first network device sends the downlink channel to the terminal device may be that: the first network device sends the downlink channel to the terminal device according to the information of the to-be-transmitted data.

It is to be understood that the first network device may be a first access network device, and the second network device may be a second access network device. When the terminal device is switched from the second access network device to the first access network device, the second access network device may send information of to-be-transmitted data to the first access network device. Or, the first network device may be an access network device, and the second network device may be a core network device. When the core network device needs to send data to the terminal device, the information of the to-be-transmitted data may be sent to the access network device, which is not limited in the embodiments of the present application.

In a possible implementation manner, the information of the to-be-transmitted data may include a data volume of uplink data and a data volume of downlink data. The operation that the first network device sends the downlink channel to the terminal device may include that: the first network device sends the downlink channel to the terminal device according to the data volume of the uplink data and the data volume of the downlink data.

Specifically, the information of the to-be-transmitted data includes a data volume of uplink data and a data volume of downlink data, and it is indicated that the first network device is desired to receive uplink data from the terminal device after sending downlink data to the terminal device. The uplink data may be, for example, a feedback about the downlink data. The operation that the first network device sends the downlink channel to the terminal device may be that: the first network device sends the downlink channel to the terminal device according to the data volume of the uplink data and the data volume of the downlink data.

In a possible implementation manner, the information of the to-be-transmitted data may include a data volume of downlink data and second indication information, the second indication information being used to indicate whether the terminal device needs to provide a feedback about the downlink data. The operation that the first network device sends the downlink channel to the terminal device may include that: when the second indication information indicates that the terminal device needs to provide a feedback about the downlink data, the first network device sends the downlink channel to the terminal device according to the second indication information and the data volume of the downlink data.

Specifically, the information of the to-be-transmitted data includes a data volume of downlink data and second indication information for indicating whether the terminal device needs to provide a feedback about downlink data. When the second indication information indicates that the terminal device needs to provide a feedback about downlink data, it is indicated that the first network device needs to send uplink data to the terminal device after sending downlink data to the terminal device. The uplink data may be, for example, a feedback about the downlink data. The operation that the first network device sends the downlink channel to the terminal device may be that: the first network device sends the downlink channel to the terminal device according to the second indication information and the data volume of the downlink data.

According to the information transmission method provided by the embodiments of the present application, when the first network device needs to send to-be-transmitted data to the terminal device, a downlink channel, which carries downlink scheduling information and uplink scheduling information that is pre-allocated to the terminal device and may be needed subsequently, may be sent to the terminal device. When the terminal device subsequently needs to send uplink data to the first network device, data transmission may be directly performed with the first network device, the downlink channel sent by the first network device and carrying the uplink scheduling information is not required to be received, thereby saving overheads of a channel and saving the time of data transmission.

In a possible implementation manner, the operation that the first network device performs data transmission with the terminal device according to the downlink channel may include that: the first network device receives uplink data which is sent by the terminal device according to the uplink scheduling information; and/or the first network device sends downlink data to the terminal device according to the downlink scheduling information.

Optionally, after the first network device sends the downlink channel to the terminal device, the terminal device may obtain uplink scheduling information and downlink scheduling information, and the first network device may perform at least one of the operations of: receiving uplink data which is sent by the terminal device according to the uplink scheduling information, or sending downlink data to the terminal device according to the downlink scheduling information.

According to a third aspect, the present application provides an information transmission method. The method may include the operations as follows.

A second network device determines information of to-be-transmitted data to be sent to a first network device.

The second network device sends the information of the to-be-transmitted data to the first network device, so that the first network device sends a downlink channel carrying uplink scheduling information and downlink scheduling information to a terminal device according to the information of the to-be-transmitted data.

It is to be understood that the first network device may be a first access network device, and the second network device may be a second access network device. When the terminal device is switched from the second access network device to the first access network device, the second access network device may send information of to-be-transmitted data to the first access network device. Or, the first network device may be an access network device, and the second network device may be a core network device. When the core network device needs to send data to the terminal device, the information of the to-be-transmitted data may be sent to the access network device, which is not limited in the embodiments of the present application.

It is to be further understood that the uplink scheduling information in the embodiments of the present application is used for the terminal device to send uplink data to the network device, and the downlink scheduling information is used for the terminal device to receive downlink data sent from the network device.

Specifically, the second network device may send information of to-be-transmitted data to the first network device. It is indicated that the second network device requires the first network device to send downlink data to the terminal device, so that the first network device sends a downlink channel to the terminal device according to the information of the to-be-transmitted data.

In a possible implementation manner, the information of the to-be-transmitted data may include a data volume of uplink data and a data volume of downlink data.

Specifically, the information of the to-be-transmitted data includes a data volume of uplink data and a data volume of downlink data, and it is indicated that the second network device is desired to receive uplink data from the terminal device after sending downlink data to the terminal device. The uplink data may be, for example, a feedback about the downlink data.

In a possible implementation manner, the information of the to-be-transmitted data may include a data volume of downlink data and second indication information, the second indication information indicating that the terminal device needs to provide a feedback about the downlink data.

Specifically, the information of the to-be-transmitted data includes a data volume of downlink data and second indication information for indicating whether the terminal device needs to provide a feedback about downlink data. When the second indication information indicates that the terminal device needs to provide a feedback about downlink data, it is indicated that the second network device needs to send uplink data to the terminal device after sending downlink data to the terminal device. The uplink data may be, for example, a feedback about the downlink data.

According to the information transmission method provided by the embodiments of the present application, when the second network device needs to send to-be-transmitted data to the terminal device, information of to-be-transmitted data may be sent to the first network device, so that the first network device sends, according to information of the to-be-transmitted data, a downlink channel carrying downlink scheduling information and uplink scheduling information that is pre-allocated to the terminal device and may be needed subsequently. When the terminal device subsequently needs to send uplink data to the first network device, data transmission may be directly performed with the first network device, the downlink channel sent by the first network device and carrying the uplink scheduling information is not required to be received, thereby saving overheads of a channel and saving the time of data transmission.

According to a fourth aspect, the present application provides a terminal device for performing the method in the first aspect or any possible implementation manners of the first aspect. Specifically, the terminal device includes a unit for performing the method in the first aspect or any possible implementation manners of the first aspect.

According to a fifth aspect, the present application provides a network device for performing the method in the second aspect or any possible implementation manners of the second aspect. Specifically, the network device includes a unit for performing the method in the second aspect or any possible implementation manners of the second aspect.

According to a sixth aspect, the present application provides a network device for performing the method in the third aspect or any possible implementation manners of the third aspect. Specifically, the network device includes a unit for performing the method in the third aspect or any possible implementation manners of the third aspect.

According to a seventh aspect, the present application provides a terminal device, including: a storage unit and a processor, the storage unit being configured to store an instruction, the processor being configured to execute an instruction stored in the memory, and when the processor executes the instruction stored in the memory, the processor being enabled to perform the method in the first aspect or any possible implementation manners of the first aspect.

According to an eighth aspect, the present application provides a network device, including: a storage unit and a processor, the storage unit being configured to store an instruction, the processor being configured to execute an instruction stored in the memory, and when the processor executes the instruction stored in the memory, the processor being enabled to perform the method in the second aspect or any possible implementation manners of the second aspect.

According to a ninth aspect, the present application provides a network device, including: a storage unit and a processor, the storage unit being configured to store an instruction, the processor being configured to execute an instruction stored in the memory, and when the processor executes the instruction stored in the memory, the processor being enabled to perform the method in the third aspect or any possible implementation manners of the third aspect.

According to a tenth aspect, the present application provides a computer-readable medium for storing a computer program, the computer program including an instruction for performing the method in the first aspect or any possible implementation manners of the first aspect.

According to an eleventh aspect, the present application provides a computer-readable medium for storing a computer program, the computer program including an instruction for performing the method in the second aspect or any possible implementation manners of the second aspect.

According to a twelfth aspect, the present application provides a computer-readable medium for storing a computer program, the computer program including an instruction for performing the method in the third aspect or any possible implementation manners of the third aspect.

BRIEF DESCRIPTION OF DRAWINGS

FIG. 1 is a schematic structural diagram of a wireless communication system to which an embodiment of the present application is applied.

FIG. 2 is a schematic flowchart of an information transmission method according to an embodiment of the present application.

FIG. 3 is a schematic flowchart of another information transmission method according to an embodiment of the present application.

FIG. 4 is a schematic flowchart of still another information transmission method according to an embodiment of the present application.

FIG. 5 is a schematic block diagram of a terminal device according to an embodiment of the present application.

FIG. 6 is a schematic block diagram of a network device according to an embodiment of the present application.

DETAILED DESCRIPTION

Figure 7:
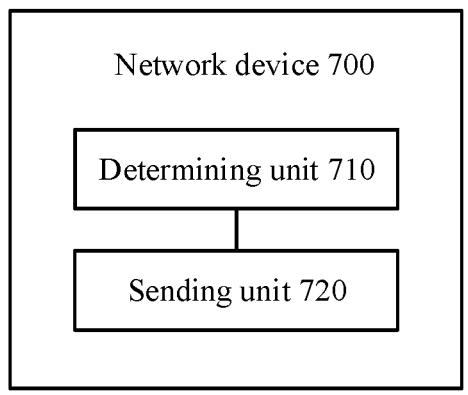
FIG. 7 is a schematic block diagram of another network device according to an embodiment of the present application.

The technical solutions in the embodiments of the present application are described hereinafter with reference to the accompanying drawings in the embodiments of the present application.

The technical solutions of the embodiments of the present application may be applied to various communication systems such as a Global System of Mobile communication (GSM), a Code Division Multiple Access (CDMA) system, a Wideband Code Division Multiple Access (WCDMA) system, a General Packet Radio Service (GPRS), a Long Term Evolution (LTE) system, an LTE Frequency Division Duplex (FDD) system, an LTE Time Division Duplex (TDD) system, a UMTS, a Worldwide Interoperability for Microwave Access (WiMAX) communication system, a future evolved Public Land Mobile Network (PLMN), or a future 5G system.

Optionally, the 5G system or network may also be referred to as a New Radio (NR) system or network.

FIG. 1 shows a wireless communication system 100 to which an embodiment of the present application is applied. The wireless communication system 100 may include at least one network device 110. The network device 110 may be a device capable of communicating with a terminal device. Each network device 110 may provide communication coverage for a specific geographic area and may communicate with a terminal device (e.g., UE) located within the coverage area. The network device 110 may be a Base Transceiver Station (BTS) in a GSM system or a CDMA system, or may be a NodeB (NB) in a WCDMA system, or may be an Evolutional Node B (eNB or eNodeB) in an LTE system, or a wireless controller in a Cloud Radio Access Network (CRAN), or the network device may be a relay station, an access point, an in-vehicle device, a wearable device, a network side device in a future 5G network or a network device in a future evolved PLMN.

The access network device may be a BTS in GSM or CDMA, or may be an NodeB (NB) in WCDMA, or an Evolutional NodeB (eNB or eNodeB) in LTE, or a relay station or an access point, or an in-vehicle device, a wearable device, and an access network device in a future 5G network.

The core network device may be a Mobility Management Entity (MME), or may be a Serving Gateway (S-GW) or a PDN Gateway (P-GW), which is not limited in the present application.

The wireless communication system 100 may further include multiple terminal devices 120 located within a coverage range of the network device 110. The terminal device 120 may be mobile or fixed. The terminal device 120 may refer to an access terminal, UE, a user unit, a user station, a mobile radio station, a mobile station, a remote station, a remote terminal, a mobile device, a user terminal, a terminal, a wireless communication device, a user agent, or a user apparatus. The access terminal may be a cellular phone, a cordless phone, a Session Initiation Protocol (SIP) phone, a Wireless Local Loop (WLL) station, a Personal Digital Assistant (PDA), a handheld device having a wireless communication function, a computing device or other processing devices connected to a wireless modem, an in-vehicle device, a wearable device, a terminal device in a future 5G network, or a terminal device in a future evolved PLMN.

FIG. 1 exemplarily shows one network device and two terminal devices. Optionally, the wireless communication system 100 may include multiple network devices, and there may be other numbers of terminal devices, except two terminal devices, within the coverage of each network device, which is not limited in the embodiments of the present application.

In order to facilitate the understanding of the embodiments of the present application, the following elements are introduced before the introduction of the embodiments of the present application.

An idle mode has only one idle state. In the Idle state, all UE connections are closed at an access layer. No context is established for UE in the idle mode in the UTRAN. If a particular UE is to be addressed, paging messages can be sent to all UEs or to multiple UEs monitoring the same paging period within one cell only.

The connection mode has four states: a Cell Paging Channel State (CELL-PCH), a UTRAN Registration Area Paging Channel State (URA-PCH), a Cell Forward Access Channel State (CELL-FACH), and a Cell Dedicated Channel State (CELL-DCH). The CELL-DCH is a connection mode for high-level signaling connections, and may also be called an "active state."

It is to be understood that when the terminal device transmits data in the CELL-DCH state, regardless of whether to send uplink data to an access network device or receive downlink data sent from the access network device, a downlink control channel needs to be sent by the access network device for scheduling.

According to the information transmission method provided by the embodiment of the present application, a terminal device receives a downlink channel sent from a first network device, the downlink channel carrying scheduling information of uplink data and scheduling information of downlink data, and the terminal device performs, according to the scheduling information of uplink data and the scheduling information of downlink data, data transmission with the first network device, so that overheads of a downlink channel can be reduced.

FIG. 2 is a schematic flowchart of a signal transmission method 200 according to an embodiment of the present application. The method 200 may be performed by a terminal device.

At S210, a terminal device receives a downlink channel sent from a first network device, the downlink channel carrying downlink scheduling information and uplink scheduling information of the terminal device.

At S220, the terminal device performs data transmission with the first network device according to the downlink channel.

Specifically, a terminal device may receive a downlink channel from the first network device before performing data transmission with a first network device, the downlink channel carrying uplink scheduling information and downlink scheduling information sent by the first network device according to a transmission resource pre-allocated to the terminal device, so as to perform data transmission with the first network device, according to the downlink channel.

Optionally, the transmission resource includes one or more of a time domain resource, a frequency domain resource, a code domain resource and a space resource, which is not limited in the embodiments of the present application.

It is to be understood that the downlink channel in the embodiments of the present application may also be a downlink signal. The downlink channel may be, for example, a downlink control channel, and the downlink signal may be, for example, a downlink control signal, which is not limited in the embodiments of the present application.

It is to be further understood that the uplink scheduling information in the embodiments of the present application is used for the terminal device to send uplink data to the network device, and the downlink scheduling information is used for the terminal device to receive downlink data sent from the network device.

Optionally, the scheduling information in the embodiments of the present application includes information about a resource location of data transmission and/or a modulation and coding level, which is not limited in the embodiments of the present application.

According to the information transmission method provided by the embodiments of the present application, the first network device provides uplink scheduling information and downlink scheduling information for the terminal device through the same downlink channel, and does not need to provide uplink scheduling information and downlink scheduling information for the terminal device through different downlink channels respectively, so that overheads of a channel can be saved.

Optionally, before S210, the terminal device may send an uplink scheduling request to the first network device, the uplink scheduling request being used to request for uplink scheduling information of uplink data to be transmitted.

Specifically, in S210, the operation that the terminal device receives a downlink channel sent from the first network device may be that: the terminal device receives the downlink channel which is sent by the first network device according to the uplink scheduling request.

Optionally, the uplink scheduling request may carry information about a data volume of the uplink data. The operation that the terminal device receives a downlink channel sent from the first network device may be that: the terminal device receives the downlink channel which is sent by the first network device according to the data volume of the uplink data.

Optionally, before the terminal device sends the uplink scheduling request to the first network device, the terminal device may acquire a scheduling request resource pre-allocated by the first network device for the uplink scheduling request. The operation that the terminal device sends the uplink scheduling request to the first network device may be that: the terminal device sends the uplink scheduling request to the first network device through the pre-allocated scheduling request resource.

Optionally, the uplink scheduling request may carry an identifier of the terminal device, so as to enable the first network device to identify the terminal device, which is not limited in the embodiments of the present application.

Optionally, the scheduling request resource may include at least one of the following: a time domain resource, a frequency domain resource, a code domain resource, or a space resource.

According to the information transmission method provided by the embodiments of the present application, the terminal device requests the first network device for uplink scheduling information, and it is indicated that the terminal device needs to send uplink data to the first network device. In this case, the terminal device may receive a downlink channel sent from the first network device, the downlink channel carrying the downlink scheduling information that may be subsequently required by the terminal device and the uplink scheduling information. When the terminal device subsequently needs to receive downlink data sent from the first network device, data transmission may be directly performed between the terminal device and the first network device, the first network device does not need to send a downlink channel carrying downlink scheduling information, thereby saving overheads of a channel and saving the time of data transmission.

Optionally, the uplink scheduling request may carry one or more of first indication information, the data volume of downlink data and a first time resource, so as to assist the first network device to determine downlink scheduling information and uplink scheduling information of the terminal device. The first indication information is used to request the first network device to send downlink scheduling information to the terminal device. The first time resource is used to indicate that the terminal device requests to receive downlink data from the first network device on the first time resource.

As an optional embodiment, the uplink scheduling request may carry first indication information for requesting downlink scheduling information, and it is indicated that the terminal device needs to receive downlink data from the first network device after sending uplink data to the first network device. The downlink data may be, for example, feedback about the first network device over the received uplink data. The operation that the terminal device receives the downlink channel which is sent by the first network device according to the uplink scheduling request may be that: the terminal device receives the uplink scheduling information and the downlink scheduling information which are sent by the first network device according to the first indication information.

As another optional embodiment, the uplink scheduling request may carry a data volume of downlink data desired to be received by the terminal device, and it is indicated that the terminal device is desired to receive downlink data from the first network device after sending uplink data to the first network device. The downlink data may be, for example, a feedback from the first network device about the received uplink data. The operation that the terminal device receives the downlink channel which is sent by the first network device according to the uplink scheduling request may be that: the terminal device receives the uplink scheduling information and the downlink scheduling information which both are sent by the first network device according to the data volume of the downlink data.

Optionally, the feedback received by the terminal device from the first network device about the uplink data in the embodiments of the present application may be an RRC feedback or an ARQ feedback, which is not limited in the embodiments of the present application.

As still another optional embodiment, the uplink scheduling request may carry a first time resource at which downlink data is received by the terminal device sent from the first network device. It is indicated that the terminal device is desired to receive downlink data sent from the first network device, and desired to receive downlink data from the first network device on the first time resource. The operation that the terminal device performs data transmission with the first network device according to the downlink channel may be that: the terminal device receives downlink data from the first network device on the first time resource.

Optionally, a time resource occupied by the downlink data may be a time resource desired to be used by the terminal device. If the terminal device is not specified, a time resource occupied by the downlink data may also be a time resource specified by the first network device, and a time resource occupied by the downlink data may also be a time resource determined according to an appointed rule between the terminal device and the first network device, which is not limited in the embodiments of the present application.

Optionally, if the terminal device is not specified to receive a time resource of downlink data, downlink scheduling information received by the terminal device may include a second time resource occupied by downlink data specified by the first network device. The operation that the terminal device performs data transmission with the first network device according to the downlink channel may be that: the terminal device receives the downlink data from the second network device on the second time resource.

Optionally, the terminal device may send uplink data to the first network device, and/or receive downlink data from the first network device after a first duration after receiving the downlink channel sent from the first network device, where the first duration may be pre-agreed with the first network device.

Optionally, after receiving the downlink channel, the terminal device may send feedback information to the first network device, so that the first network device learns that the terminal device receives the downlink channel.

Optionally, in S220, the operation that the terminal device performs data transmission with the first network device according to the downlink channel may be that: the terminal device executes at least one of the operations of: sending uplink data to the first network device according to the uplink scheduling information, or receiving downlink data which is sent by the first network device according to the downlink scheduling information. The embodiments of the present application are not limited thereto.

According to a signal transmission method provided by the embodiments of the present application, the uplink scheduling request carries assistance information for assisting the first network device to determine uplink scheduling information and downlink scheduling information, and thus the allocation of network resources can be optimized.

FIG. 3 is a schematic flowchart of a signal transmission method 300 according to an embodiment of the present application. The method 300 may be performed by a network device. The network device may be, for example, an access network device, but the embodiments of the present application are not limited thereto.

At S310, a first network device sends a downlink channel to a terminal device, the downlink channel carrying downlink scheduling information and uplink scheduling information of the terminal device.

At S320, the first network device performs data transmission with the terminal device according to the downlink channel.

It is to be understood that the downlink channel in the embodiments of the present application may also be a downlink signal. The downlink channel may be, for example, a downlink control channel, and the downlink signal may be, for example, a downlink control signal, which is not limited in the embodiments of the present application.

It is to be further understood that the uplink scheduling information in the embodiments of the present application is used for the terminal device to send uplink data to the network device, and the downlink scheduling information is used for the terminal device to receive downlink data sent from the network device.

Optionally, the scheduling information in the embodiments of the present application may include information about a resource location of data transmission and/or a modulation and coding level, which is not limited in the embodiments of the present application.

According to the information transmission method provided by the embodiments of the present application, the first network device provides uplink scheduling information and downlink scheduling information for the terminal device through the same downlink channel, and does not need to provide uplink scheduling information and downlink scheduling information for the terminal device through different downlink channels respectively, so that overheads of a channel can be saved.

Specifically, before S310, the first network device may receive an uplink scheduling request sent from the terminal device, where the uplink scheduling request is used to request for uplink scheduling information of uplink data to be transmitted. The operation that the first network device sends a downlink channel to the terminal device may be that: the first network device sends a downlink channel to the terminal device according to the uplink scheduling request.

Optionally, the uplink scheduling request may carry a data volume of the uplink data. The operation that the first network device sends a downlink channel to the terminal device may be that: the first network device sends a downlink channel to the terminal device according to the data volume of the uplink data.

Optionally, before the first network device receives the uplink scheduling request sent from the terminal device, the first network device may specify for the terminal device a scheduling request resource occupied by the uplink scheduling request. The operation that the first network device receives the uplink scheduling request sent by the terminal device may be that: the first network device receives the uplink scheduling request from the terminal device on the pre-allocated scheduling request resource.

Optionally, the uplink scheduling request may carry an identifier of the terminal device, so that the first network device identifies the terminal device, which is not limited in the embodiments of the present application.

Optionally, the scheduling request resource may include at least one of the following: a time domain resource, a frequency domain resource, a code domain resource, and a space resource.

According to the information transmission method provided by the embodiments of the present application, the first network device receives an uplink scheduling request sent from the terminal device for requesting uplink scheduling information, and it is indicated that the first network device needs to receive uplink data sent from the terminal device. In this case, the first network device may send a downlink channel to the terminal device, the downlink channel carrying the downlink scheduling information that may be subsequently required by the terminal device and the uplink scheduling information. When the first network device subsequently needs to send the downlink data to the terminal device, data transmission may be directly performed with the first network device, the downlink channel carrying the downlink scheduling information is not required to be sent again, thereby saving overheads of a channel and saving the time of data transmission.

Optionally, the uplink scheduling request may carry one or more of the first indication information, the data volume of the downlink data and the first time resource, so as to assist the first network device to determine downlink scheduling information and uplink scheduling information of the terminal device, which is not limited in the embodiments of the present application.

As an optional embodiment, the uplink scheduling request may carry first indication information for requesting downlink scheduling information, and it is indicated that the first network device needs to send downlink data to the terminal device after receiving uplink data sent from the terminal device. The downlink data may be, for example, a feedback over the received uplink data. The operation that the first network device sends the downlink channel to the terminal device according to the uplink scheduling request may be that: the first network device sends the downlink channel to the terminal device according to the first indication information.

As another optional embodiment, the uplink scheduling request may carry a data volume of downlink data desired to be received by the terminal device, and it is indicated that the terminal device is desired to receive downlink data from the first network device after the first network device receives uplink data sent from the terminal device. The downlink data may be, for example, a feedback from the first network device about the received uplink data. The operation that the first network device sends the downlink channel to the terminal device according to the data volume of the downlink data may be that: the first network device sends the downlink channel to the terminal device according to the first indication information.

Optionally, the feedback sent by the first network device to the terminal device about the uplink data in the embodiments of the present application may be an RRC feedback or an ARQ feedback, which is not limited in the embodiments of the present application.

Optionally, a time resource occupied by the downlink data may be a time resource desired to be used by the terminal device, or may be a time resource specified by the first network device, or may be a time resource determined according to an appointed rule between the terminal device and the first network device, which is not limited in the embodiments of the present application.

As an optional embodiment, the uplink scheduling request may carry a first time resource at which downlink data is desired to be received by the terminal device. It is indicated that the terminal device is desired to receive downlink data sent from the first network device, and desired to send downlink data on the first time resource. The operation that the first network device performs data transmission with the terminal device according to the downlink channel may be that: the first network device performs data transmission with the terminal device on the first time resource.

As another optional embodiment, the operation that the first network device sends the downlink channel to the terminal device according to the uplink scheduling request may be that: the first network device determines whether the uplink scheduling request carries a time resource at which downlink data is desired to be received by the terminal device after receiving the uplink scheduling request sent from the terminal device; and if the uplink scheduling request does not carry such a time resource at which downlink data is desired to be received by the terminal device, the first network device may include a second time resource, where downlink data is received by the terminal device, in the downlink scheduling information. The operation that the first network device performs data transmission with the terminal device according to the downlink channel may be that: the first network device performs data transmission with the terminal device on the second time resource.

Optionally, the second time resource may be a time resource that is determined by the first network device according to a discontinuous receiving pattern pre-configured with the terminal device.

As still another optional embodiment, the first network device may receive uplink data sent from the terminal device, and/or send downlink data to the terminal device after a first duration after the terminal device receives the downlink channel, where the first duration may be pre-agreed with the terminal device.

Optionally, after receiving the downlink channel, the terminal device may send feedback information to the first network device. After a first duration after receiving the feedback information, the first network device sends downlink data to the terminal device, and/or receives uplink data sent from the terminal device.

According to a signal transmission method provided by the embodiments of the present application, the uplink scheduling request may carry assistance information for assisting the first network device to determine uplink scheduling information and downlink scheduling information, and the allocation of network resources can be optimized.

Optionally, before S310, the first network device may receive information of to-be-transmitted data sent from a second network device. It is indicated that the second network device requires the first network device to send downlink data to the terminal device. The operation that the first network device sends a downlink channel to the terminal device may be that: the first network device sends a downlink channel to the terminal device according to the information of the to-be-transmitted data.

It is to be understood that the first network device may be a first access network device, and the second network device may be a second access network device. When the terminal device is switched sent from the second access network device to the first access network device, the second access network device may send information of to-be-transmitted data to the first access network device. Or, the first network device may be an access network device, and the second network device may be a core network device. When the core network device needs to send data to the terminal device, the information of the to-be-transmitted data may be sent to the access network device, which is not limited in the embodiments of the present application.

Optionally, the information of the to-be-transmitted data may include a data volume of uplink data and a data volume of downlink data, and it is indicated that the first network device is desired to receive uplink data from the terminal device after sending downlink data to the terminal device. The uplink data may be, for example, a feedback about the downlink data. The operation that the first network device sends the downlink channel to the terminal device may be that: the first network device sends the downlink channel to the terminal device according to the data volume of the uplink data and the data volume of the downlink data.

Optionally, the information of the to-be-transmitted data may include a data volume of downlink data and second indication information for indicating whether the terminal device needs to provide a feedback about downlink data. When the second indication information indicates that the terminal device needs to provide a feedback about downlink data, it is indicated that the first network device needs to send uplink data to the terminal device after sending downlink data to the terminal device. The uplink data may be, for example, a feedback about the downlink data. The operation that the first network device sends the downlink channel to the terminal device may be that: the first network device sends the downlink channel to the terminal device according to the second indication information and the data volume of the downlink data.

According to the information transmission method provided by the embodiments of the present application, when the first network device needs to send to-be-transmitted data to the terminal device, a downlink channel may be sent to the terminal device, the downlink channel carrying downlink scheduling information and uplink scheduling information that is pre-allocated to the terminal device and may be needed subsequently. When the terminal device subsequently needs to send uplink data to the first network device, data transmission may be directly performed with the first network device, the downlink channel sent by the first network device and carrying the uplink scheduling information is not required to be received, thereby saving overheads of a channel and saving the time of data transmission.

Optionally, in S320, after the first network device sends the downlink channel to the terminal device, the terminal device may obtain uplink scheduling information and downlink scheduling information, and the first network device may perform at least one of the operations of: receiving uplink data which is sent by the terminal device according to the uplink scheduling information, or sending downlink data to the terminal device according to the downlink scheduling information.

FIG. 4 is a schematic flowchart of a signal transmission method 400 according to an embodiment of the present application. The method 400 may be performed by a network device. The network device may be, for example, a core network device, but the embodiments of the present application are not limited thereto.

At S410, a second network device determines information of to-be-transmitted data to be sent to a first network device.

At S420, the second network device sends the information of the to-be-transmitted data to the first network device, so that the first network device sends a downlink channel carrying uplink scheduling information and downlink scheduling information to a terminal device according to the information of the to-be-transmitted data.

It is to be understood that the first network device may be a first access network device, and the second network device may be a second access network device. When the terminal device is switched from the second access network device to the first access network device, the second access network device may send information of to-be-transmitted data to the first access network device. Or, the first network device may be an access network device, and the second network device may be a core network device. When the core network device needs to send data to the terminal device, the information of the to-be-transmitted data may be sent to the access network device, which is not limited in the embodiments of the present application.

It is to be further understood that the uplink scheduling information in the embodiments of the present application is used for the terminal device to send uplink data to the network device, and the downlink scheduling information is used for the terminal device to receive downlink data sent from the network device.

Specifically, the second network device may send information of to-be-transmitted data to the first network device. It is indicated that the second network device requires the first network device to send downlink data to the terminal device, so that the first network device sends a downlink channel to the terminal device according to the information of the to-be-transmitted data.

Optionally, the information of the to-be-transmitted data may include a data volume of uplink data and a data volume of downlink data, and it is indicated that the second network device is desired to receive uplink data from the terminal device after sending downlink data to the terminal device. The uplink data may be, for example, a feedback about the downlink data.

Optionally, the information of the to-be-transmitted data may include a data volume of downlink data and second indication information for indicating whether the terminal device needs to provide a feedback about downlink data. When the second indication information indicates that the terminal device needs to provide a feedback about downlink data, it is indicated that the second network device needs to send uplink data to the terminal device after sending downlink data to the terminal device. The uplink data may be, for example, a feedback about the downlink data.

According to the information transmission method provided by the embodiments of the present application, when the second network device needs to send to-be-transmitted data to the terminal device, information of to-be-transmitted data may be sent to the first network device, so that the first network device sends, according to information of the to-be-transmitted data, a downlink channel carrying downlink scheduling information and uplink scheduling information that is pre-allocated to the terminal device and may be needed subsequently. When the terminal device subsequently needs to send uplink data to the first network device, data transmission may be directly performed with the first network device, the downlink channel sent by the first network device and carrying the uplink scheduling information is not required to be received, thereby saving overheads of a channel and saving the time of data transmission.

FIG. 5 is a schematic block diagram of a terminal device 500 according to an embodiment of the present application. The terminal device 500 includes: a receiving unit 510 and a transmission unit 520.

The receiving unit 510 is configured to receive a downlink channel sent from a first network device, the downlink channel carrying downlink scheduling information and uplink scheduling information of the terminal device.

The transmission unit 520 is configured to perform data transmission with the first network device according to the downlink channel received by the receiving unit 510.

Optionally, the terminal device may further include a sending unit. The sending unit is configured to send an uplink scheduling request to the first network device before receiving a downlink channel sent from the first network device, the uplink scheduling request being used to request for the uplink scheduling information; and the receiving unit is specifically configured to receive the downlink channel which is sent by the first network device according to the uplink scheduling request.

Optionally, the uplink scheduling request may carry first indication information, the first indication information being used to request the first network device to send the downlink scheduling information. The receiving unit is specifically configured to receive the downlink channel which is sent by the first network device according to the first indication information.

Optionally, the uplink scheduling request may carry a data volume of downlink data desired to be received by the terminal device; and the receiving unit is specifically configured to receive the downlink channel which is sent by the first network device according to the data volume of the downlink data.

Optionally, the uplink scheduling request may carry a first time resource at which downlink data is desired to be received by the terminal device; and the transmission unit is specifically configured to perform data transmission with the first network device on the first time resource.

Optionally, when the uplink scheduling request does not carry a time resource at which downlink data is desired to be received by the terminal device, the downlink scheduling information includes a second time resource occupied by the downlink data; and the transmission unit is specifically configured to perform data transmission with the first network device on the second time resource.

Optionally, the transmission unit is specifically configured to perform data transmission with the first network device according to the downlink channel and a preset first time interval, the first time interval being a time interval between a time when the terminal device receives the downlink channel and a time when the terminal device starts to perform data transmission with the first network device.

Optionally, the transmission unit is specifically configured to: send uplink data to the first network device according to the uplink scheduling information; and/or receive downlink data which is sent by the first network device according to the downlink scheduling information.

In an optional example, those skilled in the art may understand that the terminal device 500 may be specifically the terminal device in the foregoing embodiment 200, embodiment 300 and embodiment 400, and the terminal device 500 may be configured to execute various flows and/or operations corresponding to the terminal device in the foregoing embodiment 200, embodiment 300 and embodiment 400. To avoid repetition, no descriptions will be made herein.

FIG. 6 is a schematic block diagram of a network device 600 according to an embodiment of the present application. The network device 600 includes: a sending unit 610 and a transmission unit 620.

The sending unit 610 is configured to send a downlink channel to a terminal device, the downlink channel carrying downlink scheduling information and uplink scheduling information of the terminal device.

The transmission unit 620 is configured to perform data transmission with the terminal device according to the downlink channel sent by the sending unit 610.

Optionally, the network device may further include a receiving unit. The receiving unit is configured to receive an uplink scheduling request from a terminal device before a downlink channel is sent to the terminal device; and the sending unit is specifically configured to send the downlink channel to the terminal device according to the uplink scheduling request.

Optionally, the uplink scheduling request may carry first indication information, the first indication information being used to request for sending the downlink scheduling information to the terminal device; and the sending unit is specifically configured to send the downlink channel to the terminal device according to the first indication information.

Optionally, the uplink scheduling request may carry a data volume of downlink data desired to be received by the terminal device; and the transmission unit is specifically configured to send the downlink channel to the terminal device according to the data volume of the downlink data.

Optionally, the uplink scheduling request may carry a first time resource at which downlink data is desired to be received by the terminal device; and the transmission unit is specifically configured to perform data transmission with the terminal device on the first time resource.

Optionally, the sending unit is specifically configured to: determine whether the uplink scheduling request carries a time resource at which downlink data is desired to be received by the terminal device; and carry, if the uplink scheduling request does not carry a time resource at which downlink data is desired to be received by the terminal device, a second time resource at which downlink data is received by the terminal device in the downlink scheduling information; and the transmission unit is specifically configured to perform data transmission with the terminal device on the second time resource.

Optionally, the transmission unit may be specifically configured to perform data transmission with the terminal device according to the downlink channel and a preset first time interval, the first time interval being a time interval between a time when the terminal device receives the downlink channel and a time when the network device starts to perform data transmission with the terminal device.

Optionally, the network device may further include a receiving unit. The receiving unit is configured to receive information of to-be-transmitted data from a second network device before a downlink channel is sent to a terminal device; and the sending unit is specifically configured to send the downlink channel to the terminal device according to the information of the to-be-transmitted data.

Optionally, the information of the to-be-transmitted data may include a data volume of uplink data and a data volume of downlink data; and the sending unit is specifically configured to send the downlink channel to the terminal device according to the data volume of the uplink data and the data volume of the downlink data.

Optionally, the information of the to-be-transmitted data may include a data volume of downlink data and second indication information, the second indication information being used to indicate whether the terminal device needs to provide a feedback about the downlink data; and the sending unit is specifically configured to send, when the second indication information indicates that the terminal device needs to provide a feedback about the downlink data, the downlink channel to the terminal device according to the second indication information and the data volume of the downlink data.

Optionally, the transmission unit may be specifically configured to: receive uplink data which is sent by the terminal device according to the uplink scheduling information; and/or send downlink data to the terminal device according to the downlink scheduling information.

In an optional example, those skilled in the art may understand that the network device 600 may be specifically the first network device in the foregoing embodiment 200, embodiment 300 and embodiment 400, and the network device 600 may be configured to execute various flows and/or operations corresponding to the first network device in the foregoing embodiment 200, embodiment 300 and embodiment 400. To avoid repetition, no descriptions will be made herein.

FIG. 7 is a schematic block diagram of a network device 700 according to an embodiment of the present application. The network device 700 includes: a determining unit 710 and a transmission unit 720.

The determining unit 710 is configured to determine information of to-be-transmitted data to be sent to a first network device.

The transmission unit 720 is configured to send the information of the to-be-transmitted data, determined by the determining unit 710, to the first network device, so that the first network device sends a downlink channel carrying uplink scheduling information and downlink scheduling information to a terminal device according to the information of the to-be-transmitted data.

Optionally, the information of the to-be-transmitted data may include a data volume of uplink data and a data volume of downlink data.

Optionally, the information of the to-be-transmitted data may include a data volume of downlink data and second indication information, the second indication information indicating that the terminal device needs to provide a feedback about the downlink data.

In an optional example, those skilled in the art may understand that the network device 700 may be specifically the second network device in the foregoing embodiment 300 and embodiment 400, and the network device 700 may be configured to perform various flows and/or operations corresponding to the second network device in the foregoing embodiment 300 and embodiment 400. To avoid repetition, no descriptions will be made herein.

It is to be understood that the terminal device 500, the network device 600 and the network device 700 herein may be embodied in the form of functional units. The term "unit" herein may refer to an Application Specific Integrated Circuit (ASIC), an electronic circuit, a processor for executing one or more software or firmware programs (such as a shared processor, a dedicated processor or group processor) and a memory, a merge logic circuit, and/or other suitable components that support the functions described.

Figure 8:
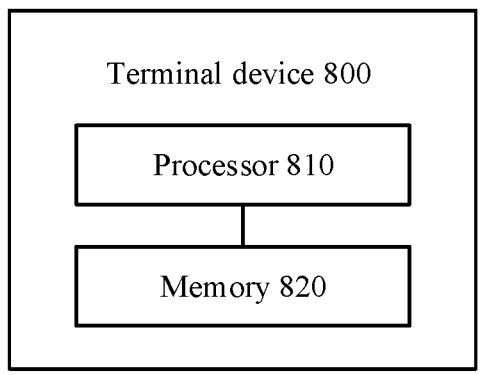
FIG. 8 is a schematic block diagram of another terminal device according to an embodiment of the present application.

FIG. 8 is a schematic block diagram of another terminal device 800 according to an embodiment of the present application. The terminal device 800 includes a processor 810 and a memory 820. The memory 820 may store a program code, and the processor 810 may execute the program code stored in the memory 820.

Optionally, the terminal device 800 may include a transceiver, and the processor 810 may control the transceiver to communicate with the outside.

Optionally, the processor 810 may call the program code stored in the memory 820 to perform the corresponding operations in the method 200 shown in FIG. 2, and details are not described herein for brevity.

Figure 9:
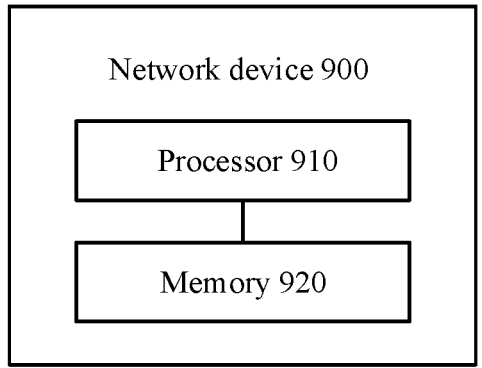
FIG. 9 is a schematic block diagram of still another network device according to an embodiment of the present application.

FIG. 9 is a schematic block diagram of still another network device 900 according to an embodiment of the present application. The network device 900 includes a processor 910 and a memory 920. The memory 920 may store a program code, and the processor 910 may execute the program code stored in the memory 920.

Optionally, the network device 900 may include a transceiver, and the processor 910 may control the transceiver to communicate with the outside.

Optionally, the processor 910 may call the program code stored in the memory 920 to perform the corresponding operations in the method 300 shown in FIG. 3, and details are not described herein for brevity.

Figure 10:
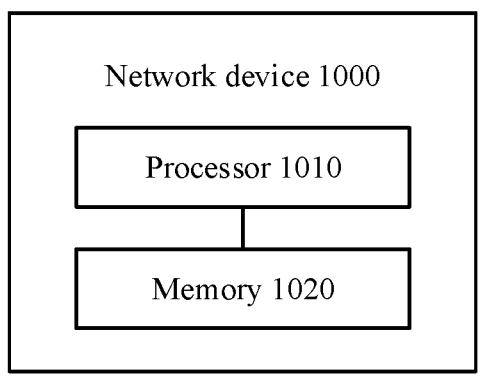
FIG. 10 is a schematic block diagram of still another network device according to an embodiment of the present application.

FIG. 10 is a schematic block diagram of still another network device 1000 according to an embodiment of the present application. The network device 1000 includes a processor 1010 and a memory 1020. The memory 1020 may store a program code, and the processor 1010 may execute the program code stored in the memory 1020.

Optionally, the network device 1000 may include a transceiver, and the processor 1010 may control the transceiver to communicate with the outside.

Optionally, the processor 1010 may call the program code stored in the memory 1020 to perform the corresponding operations in the method 400 shown in FIG. 4, and details are not described herein for brevity.

Those of ordinary skill in the art will appreciate that the units and algorithm operations of various examples described in combination with the embodiments disclosed herein can be implemented in electronic hardware or a combination of computer software and electronic hardware. Whether these functions are performed in the form of hardware or software depends on specific application and design constraints of the technical solution. A person skilled in the art can use different methods for implementing the described functions for each particular application, but such implementation should not be considered to be beyond the scope of the present application.

A person skilled in the art can clearly understand that for the convenience and brevity of the description, the specific working process of the system, the apparatus and the unit described above can refer to the corresponding process in the foregoing method embodiment, and details are not described herein again.

In the several embodiments provided by the present application, it should be understood that the disclosed systems, apparatuses, and methods may be implemented in other manners. For example, the apparatus embodiments described above are merely illustrative. For example, the division of the unit is only a logical function division. In actual implementation, there may be another division manner, for example, multiple units or components may be combined or integrated into another system, or some features may be ignored or not executed. In addition, the coupling or direct coupling or communication connection shown or discussed may be an indirect coupling or communication connection through some interfaces, apparatuses or units, and may be electrical, mechanical or otherwise.

The units described as separate components may or may not be physically separated, and the components displayed as units may or may not be physical units, that is, may be located in one place, or may be distributed to multiple network units. Some or all of the units may be selected according to actual needs to achieve the purpose of the solution of the present embodiment.

In addition, each functional unit in each embodiment of the present application may be integrated into one processing unit, or each unit may exist physically separately, or two or more units may be integrated into one unit.

The functions may be stored in a computer-readable storage medium if being implemented in the form of a software functional unit and sold or used as a standalone product. Based on such understanding, the technical solution of the present application, which is essential to the prior art or part of the technical solution, may be embodied in the form of a software product stored in a storage medium, including a plurality of instructions used to cause a computer device (which may be a personal computer, server, or network device, etc.) to perform all or part of the operations of the methods described in various embodiments of the present application. The foregoing storage medium includes: a U disk, a mobile hard disk, a ROM, a RAM, a magnetic disk, or an optical disk, and the like, which may store a program code.

The foregoing is only a specific implementation manner of the present application, but the scope of protection of the present application is not limited thereto. Any person skilled in the art can easily think of changes or replacements within the technical scope disclosed in the present application, which should be covered by the scope of protection of the present application. Therefore, the scope of protection of the present application should be determined by the scope of the claims.

The invention claimed is:

1. An information transmission method, comprising:
    sending, by a terminal device, an uplink scheduling request to a first network device, the uplink scheduling request being used to request for uplink scheduling information;
    receiving, by the terminal device, a downlink channel sent from the first network device, wherein the downlink channel is sent by the first network device according to the uplink scheduling request and carries downlink scheduling information and the uplink scheduling information of the terminal device, and the downlink scheduling information comprises a second time resource occupied by downlink data; and
    performing, by the terminal device, data transmission with the first network device on the second time resource according to the downlink channel and a preset first time interval, wherein the first time interval is a time interval between a time when the terminal device receives the downlink channel and a time when the terminal device starts to perform the data transmission with the first network device;
wherein the uplink scheduling request carries first indication information, the first indication information being used to request the first network device to send the downlink scheduling information;
receiving, by the terminal device, the downlink channel which is sent by the first network device according to the uplink scheduling request comprises:
receiving, by the terminal device, the downlink channel which is sent by the first network device according to the first indication information.

2. The method according to claim 1, wherein the uplink scheduling request carries a data volume of downlink data desired to be received by the terminal device;
receiving, by the terminal device, the downlink channel which is sent by the first network device according to the uplink scheduling request comprises:
receiving, by the terminal device, the downlink channel which is sent by the first network device according to the data volume of the downlink data.

3. The method according to claim 1, wherein the uplink scheduling request carries a first time resource at which downlink data is desired to be received by the terminal device;
performing, by the terminal device, the data transmission with the first network device according to the downlink channel comprises:
performing, by the terminal device, the data transmission with the first network device on the first time resource.

4. The method according to claim 1, wherein performing, by the terminal device, the data transmission with the first network device according to the downlink channel comprises at least one of following operations:
sending, by the terminal device, uplink data to the first network device according to the uplink scheduling information; or
receiving, by the terminal device, the downlink data which is sent by the first network device according to the downlink scheduling information.

5. A terminal device, comprising:
a transceiver; and
a processor configured to control the transceiver for communication;
wherein the processor is configured to control the transceiver to:
send an uplink scheduling request to a first network device, the uplink scheduling request being used to request for uplink scheduling information;
receive a downlink channel sent from a first network device, wherein the downlink channel is sent by the first network device according to the uplink scheduling request and carries downlink scheduling information and the uplink scheduling information of the terminal device, and the downlink scheduling information comprises a second time resource occupied by downlink data; and
perform data transmission with the first network device on a second time resource according to the downlink channel and a preset first time interval, wherein the first time interval is a time interval between a time when the terminal device receives the downlink channel and a time when the terminal device starts to perform the data transmission with the first network device;
wherein the uplink scheduling request carries first indication information, the first indication information being used to request the first network device to send the downlink scheduling information; and
the processor is configured to control the transceiver to receive the downlink channel which is sent by the first network device according to the first indication information.

6. The terminal device according to claim 5, wherein the uplink scheduling request carries a data volume of downlink data desired to be received by the terminal device; and
the processor is configured to control the transceiver to receive the downlink channel which is sent by the first network device according to the data volume of the downlink data.

7. The terminal device according to claim 5, wherein the uplink scheduling request carries a first time resource at which downlink data is desired to be received by the terminal device; and
the processor is configured to control the transceiver to perform the data transmission with the first network device on the first time resource.

8. The terminal device according to claim 5, wherein the processor is configured to control the transceiver to perform at least one of following operations:
send uplink data to the first network device according to the uplink scheduling information; or
receive the downlink data which is sent by the first network device according to the downlink scheduling information.

* * * * *